3,179,628
TRIETHYLENE DIAMINE AND A POLYIMINE CO-CATALYST SYSTEM POLYURETHANE POLYMERIZATION

Burton D. Beitchman, Springfield Township, and Jack H. Krause, Media, Pa., assignors to Air Products and Chemicals Inc., Philadelphia, Pa., a corporation of Delaware
No Drawing. Filed Mar. 8, 1963, Ser. No. 263,730
4 Claims. (Cl. 260—77.5)

This invention relates to catalysts having advantages in the polymerization of reaction mixtures polymerizable under the influence of reactive groups such as tertiary amine groups and imine groups and catalysts cooperating with such nitrogen compounds.

As explained in U.S. Patent No. 3,054,757, a tertiary imine such as N-ethyl-ethyleneimine is effective for catalyzing the polymerization of a mixture comprising a polyisocyanate and a compound such as a polyetherpolyol having a plurality of reactive hydrogen atoms. As explained in the application of Burton D. Beitchman, Serial No. 188,944, filed April 20, 1962, entitled "Polymerization and Catalyst for Same," of which this is a continuation-in-part, tertiary imines are especially effective as co-catalysts in combination with a supplemental polymerization catalyst such as triethylenediamine, epoxy alkane, or the like.

In accordance with the present invention a reactive mixture is polymerized in the presence of a co-catalyst system comprising as one component a polyurethane catalyst and as the second component catalytic amounts of a non-volatile polyimine containing at least 2 alkylene imine groups characterized by a 3-membered aza ring, there being a group connecting the aza nitrogen atoms, whereby each of the alkylene imine groups is effective in catalyzing the polymerization reaction. Certain preferred polyimines may be described as bis-ureas having two urea groups in which a terminal nitrogen is an ethyleneimine, described as an N,N-ethylene group (not the N,N' bonding of ethylene urea) resulting from the interaction of each of two isocyanato groups with two molecules of ethyleneimine. Such groups are described as N,N-ethylene carbamido groups.

The nature of the invention is further clarified by reference to a plurality of examples.

Example I

The effectiveness of various catalyst systems for the polymerization of tolylene diisocyanate was evaluated by noting the peak temperature and the time for attaining such peak temperature subsequent to the addition of the controlled amount of catalyst to a 50 milliliter sample of tolylene diisocyanate. It was established that each component was substantially ineffective in itself, but that the combination of triethylenediamine and a compound having a plurality of imine groups as co-catalysts was spectacularly effective.

There was no significant reaction when 0.25 g. of triethylenediamine was employed as the polymerization catalyst, so that the peak temperature was 27° C., or substantially room temperature. The same absence of change during a 4 hour period was noted: in the use of 0.5 g. of tris 1-aziridinyl phosphine oxide (one brand of this compound is marketed as Chemirad APO); in the use of 0.3 g. 1,6-bis-(N,N-ethylene carbamido)-hexane (one brand of this compound is marketed as Carbamide BHE); and in the use of 0.6 g. of 2,4-bis-(N,N-ethylene carbamido)-toluene (one brand of which is marketed as Carbamide BTO).

The importance and advantages of employing a co-catalyst system were shown in tests in which a combination of 0.25 g. of triethylenediamine (marketed under the DABCO brand and abbreviated as TEDA) and a slightly greater amount of polyimine served as co-catalysts for the polymerization of TDI. A temperature of 133° C. was attained in 2½ hours when the 50 milliliters of TDI were polymerized in the presence of 0.25 g. TEDA and 0.5 g. tris aziridinyl phosphine oxide.

A temperature of 165° was attained in 7 minutes when using 0.25 g. TEDA and 0.3 g. of 1,6-bis-(N,N-ethylene carbamido)-hexane.

A temperature of 145° C. was attained in 3.5 minutes using a mixture of 0.25 g. TEDA and 0.6 g. 2,4-bis-(N,N-ethylene carbamido)-toluene.

The rapid and extensive polymerization reaction of isocyanato groups in the presence of the co-catalyst indicated that the co-catalyst system favored polymerization of the isocyanato groups. The speed and magnitude of the polymerization established that the co-catalyst system had an outstanding effectiveness.

Example II

A polyol mixture of acceptable viscosity was prepared by mixing a technical grade of heptapropylene etherglycol (generally known as polypropylene glycol having an average molecular weight of about 425 or PPG 425) in an amount of 21.3 g. and polybutyleneglycol having an average molecular weight of about 1500 (generally known as a polyol, and sometimes designated as B1500), in an amount of 56.2 g. To this mixture of polyols, there was added 25 milliliters of tolylene diisocyanate (known as TDI). The co-catalyst system was achieved by dissolving 0.25 g. triethylenediamine in the polyol and 0.5 g. of 1,6-bis-(N,N-ethylene carbamido)-hexane in the TDI. This mixture was stirred for 30 seconds during which the viscosity significantly increased, and the reaction mixture set up as a polyurethane elastomer in about 45 seconds. Such speed of formation of a cast polyurethane elastomer, starting with convenient reactants at about room temperature, provides a convenience not previously approached by most polyurethane catalyst systems.

Example III

A solution of 70 g. of PPG 425 containing 0.25 g. of dissolved triethylenediamine, is mixed with 78 g. of small particle size silica, and thereafter degassed under vacuum for 30 minutes. The slurry of silica in polyol is mixed with 25 ml. of tolylene diisocyanate containing 0.5% 2,4-bis-(N,N-ethylene carbamido)-toluene and is cast onto a plate mold for polymerization into a polyurethane rubber. The silica-filled elastomer is removed from the plate mold less than one hour after casting the elastomer. The elastomer has advantageous properties for a filled polyurethane rubber cast and cured at ambient temperature.

Example IV

A flexible polyurethane foam cushion is prepared by the froth technique, in which a mixture of dimethyl ether, dichlorodifluoromethane, trichlorofluoromethane and related propellants is dissolved at high pressure in each of the principal ingredients described in Example II and the pressurized solutions are rapidly mixed and ejected through a froth nozzle into a mold at atmospheric pressure. The composition is transformed into a froth, which is transformed into a strong flexible foam under the rapid action of the co-catalyst system of triethylenediamine (dissolved initially in the mixture of propellants and polyalkyleneetherglycols) and 1,6-bis-(N,N-ethylene carbamido)-hexane (dissolved initially in the mixture of propellants and TDI).

Example V

A rigid polyurethane foam is prepared following the procedure of Example IV but substituting a polyfunctional alcohol (e.g., hexapropoxysorbitol) for the polyglycol. The rigid foam has desirable insulating characteristics.

Each of the three compounds investigated was shown to have important industrial advantages over N-methyl ethylene imine and/or other mono-imines, partly by reason of the low vapor pressure of the polyimines employed herein.

Various modifications of the invention are possible without departing from the scope of the appended claims.

What is claimed is:

1. In the preparation of polyurethane material in which a reaction mixture containing tolylene diisocyanate and a polyetherpolyol is catalytically reacted by reason of admixing with such reaction mixture a catalyst composition, the improvement which consists of preparing the polyurethane by admixing with such reaction mixture a co-catalyst composition consisting of triethylenediamine, and a polyimine selected from the group consisting of tris 1-aziridinyl phosphine oxide, 1,6-bis(N,N-ethylene carbamino)-hexane, and 2,4-bis (N,N-ethylene carbamido) toluene.

2. In the preparation of polyurethane material in which a reaction mixture containing tolylene diisocyanate and a polyetherpolyol is catalytically reacted by reason of admixing with such reaction mixture a catalyst composition, the improvement which consists of preparing the polyurethane by admixing with such reaction mixture a co-catalyst composition consisting of triethylenediamine, and tris 1-aziridinyl phosphine oxide.

3. In the preparation of polyurethane material in which a reaction mixture containing tolylene diisocyanate and a polyetherpolyol is catalytically reacted by reason of admixing with such reaction mixture a catalyst composition, the improvement which consists of preparing the polyurethane by admixing with such reaction mixture a co-catalyst composition consisting of triethylenediamine, and 1,6-bis-(N,N-ethylene carbamido)-hexane.

4. In the preparation of polyurethane material in which a reaction mixture containing tolylene diisocyanate and a polyetherpolyol is catalytically reacted by reason of admixing with such reaction mixture a catalyst composition, the improvement which consists of preparing the polyurethane by admixing with such reaction mixture a co-catalyst composition consisting of triethylenediamine, and 2,4-bis-(N,N-ethylene carbamido)-toluene.

References Cited by the Examiner
UNITED STATES PATENTS 2,939,851  6/60  Orchin _____ 260—77.5
3,042,632  7/62  Erner _____ 260—77.5
3,054,757  9/62  Britain _____ 260—77.5

OTHER REFERENCES

Le Chimica e l'Industria, April 1960, pages 388–389.
Comptes Rendus, January 1961, pages 111–112.

LEON J. BERCOVITZ, *Primary Examiner.*

J. R. LIBERMAN, *Examiner.*